United States Patent
Dale, Jr. et al.

(10) Patent No.: US 7,269,997 B2
(45) Date of Patent: Sep. 18, 2007

(54) NON-CONTACT METHOD AND SYSTEM FOR TIRE ANALYSIS

(75) Inventors: James L. Dale, Jr., Conway, AR (US); Wen Yu Zhou, Conway, AR (US); Frederick J. Rogers, North Little Rock, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 89 days.

(21) Appl. No.: 10/859,151

(22) Filed: Jun. 3, 2004

(65) Prior Publication Data

US 2005/0268707 A1    Dec. 8, 2005

(51) Int. Cl.
*G01M 17/02* (2006.01)

(52) U.S. Cl. .................. 73/146; 152/209; 340/438

(58) Field of Classification Search .............. 73/146, 73/146.2, 146.3, 146.4, 146.5, 146.8; 152/209, 152/154; 340/438
See application file for complete search history.

(56) References Cited

U.S. PATENT DOCUMENTS

| | | | |
|---|---|---|---|
| 3,878,712 A | | 4/1975 | Chapin et al. |
| 4,184,365 A | | 1/1980 | Webster |
| 4,350,942 A | * | 9/1982 | Heisner et al. ............ 318/626 |
| 4,945,966 A | * | 8/1990 | Ogawa .................. 152/209.19 |
| 5,054,918 A | | 10/1991 | Downing et al. |
| 5,245,867 A | | 9/1993 | Sube et al. |
| 5,506,683 A | | 4/1996 | Yang et al. |
| 5,759,313 A | * | 6/1998 | Shirai et al. ............ 152/209.18 |
| 5,789,668 A | | 8/1998 | Coe et al. |
| 5,987,978 A | | 11/1999 | Whitehead |
| 6,069,966 A | | 5/2000 | Jones et al. |
| 6,789,416 B1 | * | 9/2004 | Tracy et al. ................. 73/146 |
| 6,883,962 B2 | * | 4/2005 | Kurata ........................ 374/57 |
| 2003/0006890 A1 | * | 1/2003 | Magaiwala et al. ......... 340/438 |
| 2005/0057758 A1 | * | 3/2005 | Uehara ....................... 356/601 |

FOREIGN PATENT DOCUMENTS

| | | |
|---|---|---|
| EP | 0 547 365 A | 6/1993 |
| EP | 0 816 799 A | 1/1998 |
| EP | 1 148 328 A | 10/2001 |
| WO | PCT/US00/00989 | 1/2000 |

OTHER PUBLICATIONS

Hans Joachim, 6th Tire Safety Day and Fulda Laser Check Sept. 2000, www.fulda-relian.com.*
Mitutoyo Automotive Technology, DigiSan.*

* cited by examiner

*Primary Examiner*—Andre J. Allen
(74) *Attorney, Agent, or Firm*—McDermott Will & Emery LLP

(57) ABSTRACT

A non-contact method and system for analyzing tire conditions. The system includes an emitter source for emitting radiation signals towards a tire having a treaded surface between two sidewalls. A detector is provided to receive signals reflected by the tire in response to the emitted radiation signals. A data processing system, coupled to the emitter source and the detector, obtains geometrical information, such as height, of a plurality points on the tire based on the signals received from the detector. The data processing system determines a condition of the tire by comparing geometrical information for a designated portion of the plurality points with other portion points on the tire. A color-coded surface profile showing a height distribution of the tire is also generated to assist diagnosis of the tire.

20 Claims, 8 Drawing Sheets

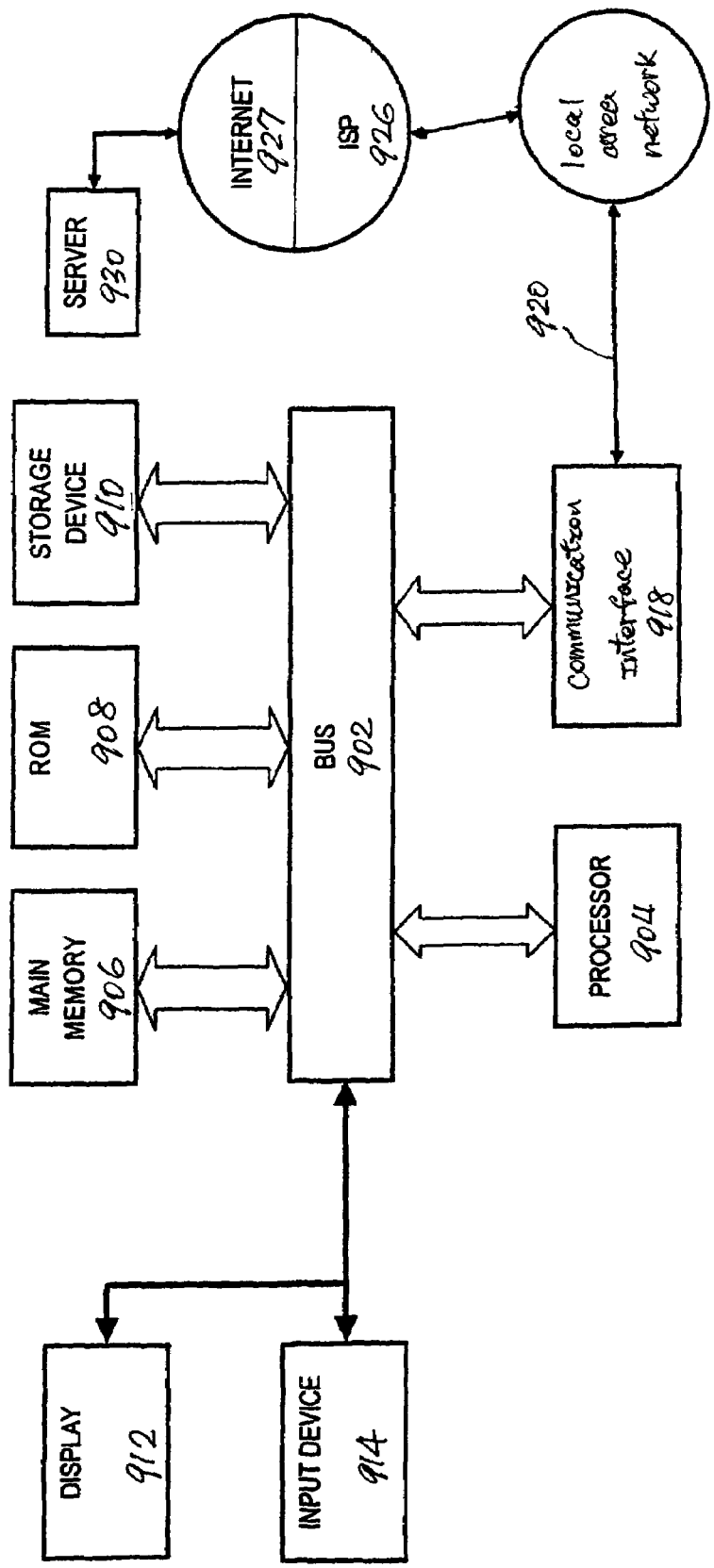

NON-CONTACT METHOD AND SYSTEM FOR TIRE ANALYSIS

FIELD OF DISCLOSURE

This disclosure generally relates to vehicle service systems utilizing non-contact data collection and analysis, and more specifically, to applying unique analytical methods to data obtained by non-contact measurement systems in order to determine conditions of tires or wheel assemblies by creation and analysis of a profile of the tire or wheel assembly.

BACKGROUND AND SUMMARY OF THE DISCLOSURE

The following terms may be used throughout the descriptions presented herein and should generally be given the following meanings unless contradicted or elaborated upon by other descriptions set forth herein.

"Wheel" refers to a generally cylindrical, typically metallic, disc-like mechanical support for supporting a typically pneumatic tire and mounting to a vehicle axle. A wheel has two axially spaced-apart flanges (or annular lips), each flange adapted to securely receive a respective one of the two beads of the mounted tire.

"Tire" is a laminated mechanical device of generally toroidal shape (usually an open-torus) having two beads, two sidewalls and a treaded surface, made of rubber, chemicals, fabric and steel or other materials, and typically inflated with air under pressure. A tire is mounted in the rim bed of a rim.

"Sidewall" of a tire refers to a portion of the tire between the treaded surface and the bead.

The term 'rim' refers to the part of a wheel that is made of metal, in particular aluminum, steel, or other alloy, and to which a pneumatic tire, usually made of rubber, is attached. The rim includes a peripherally extending rim bed to which the tire is attached, and a wheel disc portion within the peripherally extending rim bed. That wheel disc portion may have apertures or no aperture at all. The wheel disc may also be formed from spokes.

"Wheel assembly" generally refers to a tire, a combination of a rim and a tire attached thereto, or a wheel.

This disclosure presents non-contact methods and systems for determining a condition of a tire and/or wheel assembly. The tire is fundamentally a rotational axis and a treaded surface disposed between two sidewalls. A non-contact measurement system is used to obtain and determine geometrical parameters of the tire and/or wheel assembly. An exemplary system includes an emitter source for emitting radiation signals towards the tire. A detector is provided for receiving signals reflected from the tire in response to the emitted radiation signals. The reflected signals are fed to a data processing system, such as a computer to determine conditions of the tire/wheel assembly. The data processing system obtains geometrical information, such as height or depth relative to a reference baseline, of a plurality points on the tire, of a plurality points on the tire/wheel assembly is obtained based on the signals received from the detector. According to one embodiment, the plurality of points are on a path extending in a direction from one of the sidewalls to the other. This path may be parallel to the rotational axis of the tire. Based on the height information obtained by the data processing system, a cross-sectional profile of the tire may be created.

In order to determine the condition of the tire, wear conditions of different portions of the tire are compared with each other, to determine whether the tire has uneven wear, and whether the tire has been operated over-inflated or under-inflated. In one aspect, a wear condition comparison is made between points located on one side of a centerline of the circumferential surface of the tire (mostly includes the treaded surface), with points on the other side of the centerline. If a significant difference exists, it is determined that the tire has uneven wear.

According to another embodiment, a wear condition comparison is made between points inside a region extending from the centerline of the circumferential surface towards the sidewalls for a prescribed distance, and points outside the region. For example, this region may be a belt-shape area along the circumferential centerline of the tire. If tire wear in the region is more severe than points outside this region, it is determined that the tire has been operated or run over-inflated. Otherwise, the tire has been operated or run under-inflated. According to still another embodiment, a comparison is made between adjacent tread blocks to determine existence of a sawtooth pattern. If the height of a tread block is significantly lower than the height of the adjacent tread block, it is indicated that the tire has a sawtooth pattern.

The condition of the tire may be determined by generating a surface profile showing respective heights or depths on the surface of the tire. For example, the surface of the tire can be scanned by rotating the wheel assembly to which the tire is attached for 360 degrees. During the rotation, the emitter source continuously emits radiations onto the wheel assembly, and the detector continuously obtains signals reflected from the tire/wheel assembly. A surface profile showing the complete circumferential surface is created. The height/depth information may be shown on a screen using different colors, such that a height distribution on the tire surface is easily observable. The profile may further include height information of the sidewalls. Thus, a bulge on the sidewalls can be determined or observed based on the established surface profile of the tire.

A tire match condition can also be determined by further establishing a profile of a rim to which the tire is attached, by using non-contact measurement systems. Geometrical parameters of a plurality of points located on the treaded surface of the tire and the rim are obtained. For example, the width of the tire and the width of the rim are determined and compared with each other. If a difference between the width of the rim and the width of the tire exceeds a threshold, it is indicated that the tire and the wheel do not match well. According to another embodiment, geometrical parameters of at least one of the sidewalls and the rim are generated. An angle between the one of the sidewalls and the rim is determined. If the absolute value of the angle exceeds a threshold, it is indicated that the tire and the wheel do not match well.

Still other advantages of the presently disclosed methods and systems will become readily apparent from the following detailed description, simply by way of illustration of the invention and not limitation. As will be realized, examples illustrated herein are capable of other and different embodiments, and their several details are capable of modifications in various obvious respects, all without departing from the disclosure. Accordingly, the drawing and description are to be regarded as illustrative in nature, and not as restrictive.

BRIEF DESCRIPTIONS OF THE DRAWINGS

The accompanying drawings, which are incorporated in and constitute a part of the specification, illustrate exemplary embodiments.

FIG. 1c depicts details of the exemplary non-contact analytical system shown in FIG. 1a.

FIG. 13 is a block diagram of a data processing system used in the non-contact analytical system.

DETAILED DESCRIPTIONS OF ILLUSTRATIVE EMBODIMENTS

In the following description, for the purposes of explanation, numerous specific details are set forth in order to provide a thorough understanding of the present disclosure. It will be apparent, however, to one skilled in the art that the present method and system may be practiced without these specific details. In other instances, well-known structures and devices are shown in block diagram form in order to avoid unnecessarily obscuring the present disclosure.

Figure 1A:
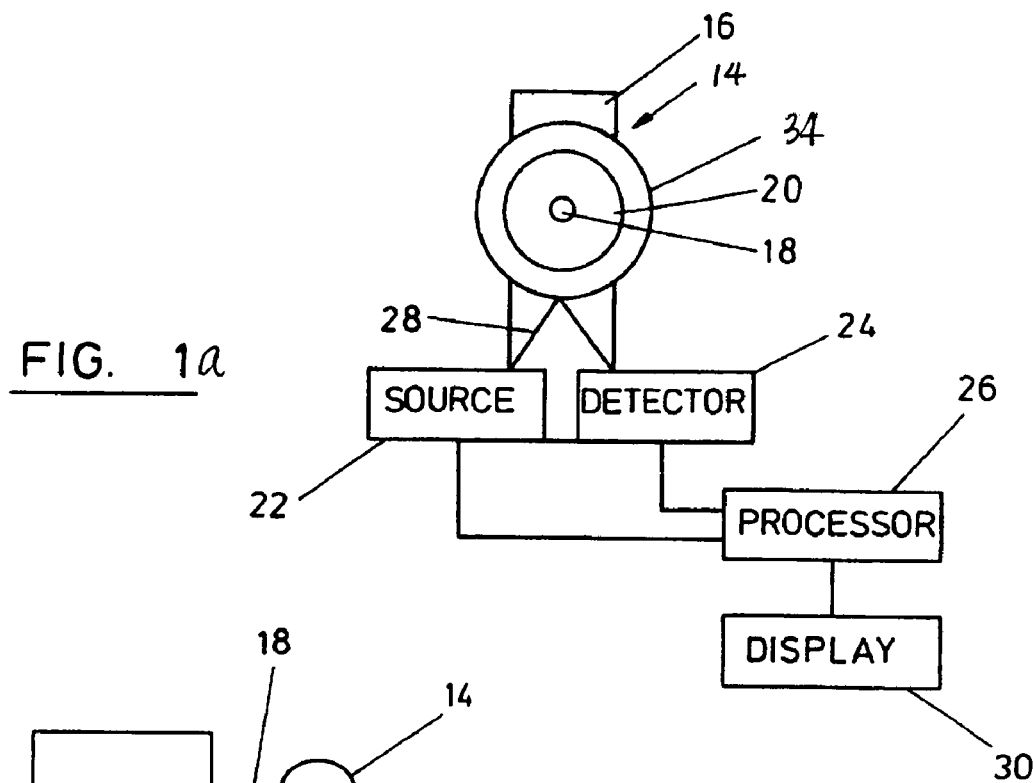
FIGS. 1a and 1b show an exemplary non-contact analytical system for determining the condition of a tire or wheel assembly.
Figure 1B:
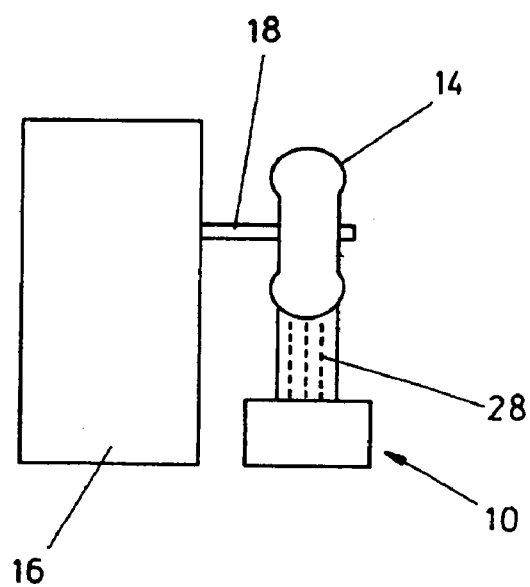

FIGS. 1a and 1b show an exemplary non-contact analytical system 10 for determining the condition of a tire 34 or wheel assembly 14 by analyzing a profile of the tire 34 or wheel assembly 14 that includes geometrical information, such as height and/or depth, related to various points of the tire 34 or wheel assembly 14. Examples of various types of non-contact measurement devices are discussed in U.S. Pat. No. 6,535,281, titled "METHOD AND APPARATUS FOR OPTICALLY SCANNING A VEHICLE WHEEL," and U.S. Pat. No. 6,069,966, titled "APPARATUS AND METHOD FOR TIRE CONDITION ASSESSMENT;" and a co-pending U.S. patent application Ser. No. 10/765,207, titled "METHOD AND APPARATUS FOR OPTICALLY SCANNING A PNEUMATIC TIRE OF A VEHICLE WHEEL," filed on Jan. 28, 2004; a co-pending patent application Ser. No. 10/765,206, entitled "METHOD AND APPARATUS FOR BALANCING A MOTOR VEHICLE WHEEL," filed Jan. 28, 2004; a co-pending patent application Ser. No. 10/765,274, entitled "METHOD AND APPARATUS FOR OPTICALLY SCANNING A VEHICLE WHEEL," filed Jan. 28, 2004," and a co-pending patent application Ser. No. 10/765,275, entitled "METHOD OF MATCHING A VEHICLE WHEEL," filed Jan. 28, 2004." All of the above-identified patents and applications are commonly assigned to the assignee of this application. Methods and apparatus for using non-contact measurements to obtain profile of tires are described in U.S. Pat. No. 5,789,668, titled "APPARATUS AND RELATED METHODS FOR OBTAINING TIRE PROFILES INCLUDING THE TREAD AND BOTH SIDEWALLS," U.S. Pat. No. 5,245,867, entitled "METHOD AND APPARATUS FOR MEASURING TIRE PARAMETERS," and U.S. Pat. No. 5,987,978, entitled "APPARATUS FOR TESTING TIRE TREAD DEPTH." All of the above-identified patents and applications are incorporated herein by reference in their entireties.

Figure 2:
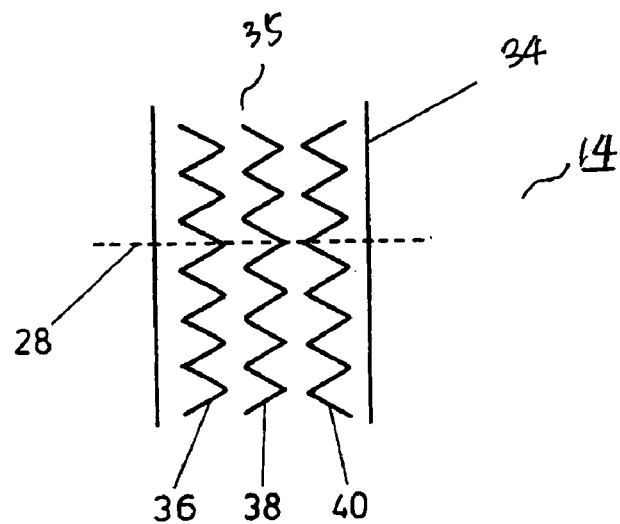
FIG. 2 shows a partial surface of a wheel assembly of which the profile is being created by the non-contact measuring system.

FIG. 2 depicts a partial surface of a wheel assembly 14 of which the profile is being created by the non-contact measuring system 10. The wheel assembly 14 includes a tire 34 and rim 20 (shown in FIG. 1a) to which tire 34 is mounted. As defined earlier, tire 34 includes two beads, two sidewalls and a treaded surface 35. Treaded surface 35 includes tread patterns 36, 38, 40.

As shown in FIGS. 1a and 1b, non-contact analytical system 10 includes a rotary mounting 12 with a driven axle 18 for wheel assembly 14 to be attached thereto, an emitter source 22, such as laser, plane of light, ultrasonic waves, etc., and a detector 24, such as cameras, CCD (charged-coupled device) or CMOS (complementary metal-oxide-semiconductor) detectors, etc., and a data processing system 26, such as a computer. By emitting radio signals, such as laser, light, ultrasonic waves, to the surface of wheel assembly 14, and analyzing reflected signals reflected by the surface of wheel assembly 14, data processing system 26 creates a profile of the surface of wheel assembly 14, including the shape and/or depth of tread patterns 36, 38, 40, sidewalls, bead, rim 20, and outputs an image representing the profile on display 30. Emitter source 22 may include one or more emitting elements arranged in different angles around wheel assembly 14 to achieve better detection of signals.

Figure 1C:
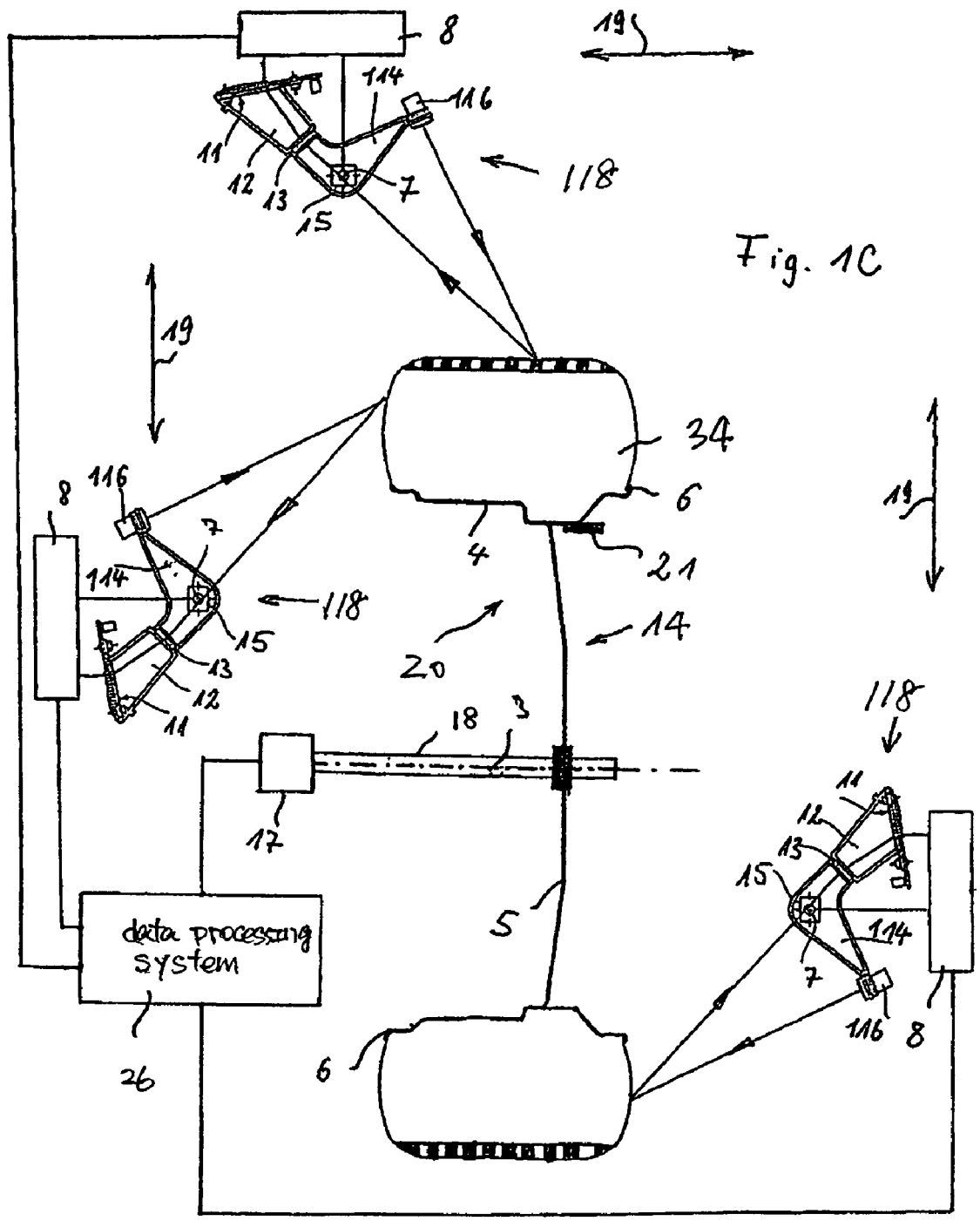

FIG. 1c depicts details of the exemplary non-contact analytical system 10. As shown in FIG. 1c, wheel assembly 14 has a wheel disc portion 5 and a rim bed 4 fixed to the periphery of the wheel disc portion 5. Tire 34 is mounted on rim bed 4. Tire beads are supported in known manner at rim flanges 6 of rim bed 4. Rim bed 4 and wheel disc portion 5 form a rim 20. Wheel assembly 14 is fixed in known manner to a measuring shaft 18, and is rotatably supported about an axis of rotation defined by measuring shaft 18. When the wheel is clamped in a centered position, measuring shaft 18 coincides with wheel axis 3, which ensures that wheel axis 3 is stationary.

Parameters related to wheel assembly 14 are measured by one or more detector devices 118, and ascertained using data processing system 26. Each detector device 118 includes an emitter source 116, such as a laser, and a receiver 12, such as a CCD-detector, as a position-sensitive receiving element. The emitter source 116 and the receiver 12 are fixed to a carrier 114, which is supported pivotably about a pivot axis 7. Carrier 114 can move along the direction indicated by arrow 19 or on a predetermined guide path with respect to the measuring shaft 18. The pivotal movement and the optionally additional linear or guided movement can be implemented by means of a drive (not shown), such as one or more stepping motors. A receiver optical system 13 is also provided on carrier 114. The receiver optical system 13 and the CCD-detector 11 are constituent parts of the receiver 12.

Emitter source 116 emits a light beam, such as stripe beam 28 shown in FIG. 2, onto the surface of tire 34, including, for example, tire tread, tire sidewalls, rim, etc. The light beam is then reflected passing through the receiver optical system 13 on to the detector elements of the CCD-detector 11. The CCD-detector 11 can detect a plurality of local maxima of an illumination intensity function, independently of each other. The direction of the reflected beam depends on the distance of the location scanned on tire 34, with respect to the emitter source 116 and with respect to receiver 12. Based on the distance, the reflected beam is directed by receiver optical system 13 on to a given location of the CCD-detector 11 and converted into a position-sensitive or position-dependent signal. That signal is passed to an electronic measuring device 8, which is further connected to a position detector 15. Position detector 15 supplies electronic measuring device 8 with position signals that are representing to the respective positions of emitter source 116 and CCD-detector 11. Emitter source 116 and receiver 12 are capable of moving together with each other as they are fixed to the common carrier 114. The position signals are related to a reference position known to the system, and are thus related to the measuring shaft 18 to which the wheel assembly 14 is fixed. The electronic measuring device 8 produces measurement signals of wheel assembly 14, which are scanned by the light beams emitted by the emitter source 116.

Surface of wheel assembly 14, including tire 34, rim 14, sidewalls, etc., can be detected by detector devices 118 associated with the inside surface (left-hand detector device 118 in the FIG. 1), the outside surface (right-hand detector device 118 in the FIG. 1), and the treaded surface (upwardly disposed detector device 118 in the FIG. 1) of wheel assembly 14. It is also possible to use only one detector device 118 that moves to suitable measuring positions on a predetermined guide path to the inside, the outside, and also the treaded surface of wheel assembly 14.

The respective rotary angle position of wheel assembly 14 can be determined by a rotary angle detector 17, which is connected to the measuring shaft 18, and supplies rotary angle increments to data processing system 26 indicating the rotary movement of wheel assembly 14. The data sensed by the rotary angle detector 17 includes information related to the respective rotary angle positions of wheel assembly 14, which is being scanned by the respective detector device 118. A tire inflation valve 21 can serve as a scan reference when detector device 118 scans the wheel assembly 14 to determine the rotary angle location of wheel assembly 14.

Figure 3:
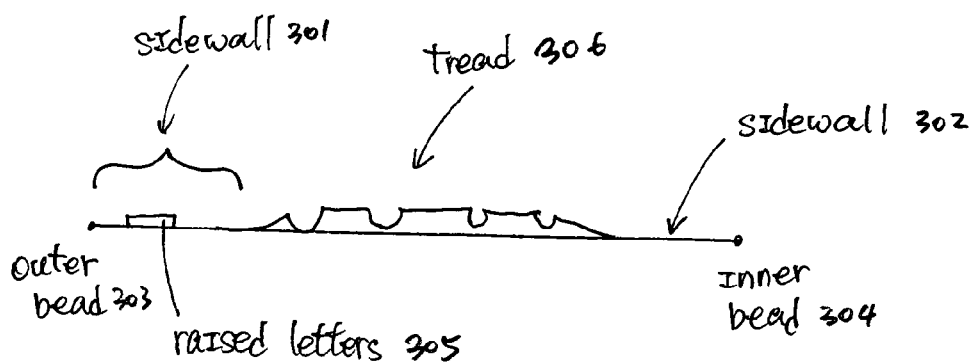
FIG. 3 is an exemplary stripe profile of a tire.

As shown in FIG. 1a and FIG. 2, emitter source 22 emits a well-defined stripe 28 of light having a uniform intensity on the surface of tire 14. Light signals reflected from the surface of wheel assembly 14 are received by detector 24, which sends the received light signals to data processing system 26 for analyzing the profile of the surface of wheel assembly 14 (explained in detail below). Data processing system 26 generates a stripe profile for a stripe portion of wheel assembly 14 illuminated by emitted light 28. An example of a stripe profile is shown in FIG. 3. The exemplary stripe profile includes two side walls 301, 302, outer bead 303, inner bead 304, and tread 306 of tire 34. Raised letters 305 molded on outer sidewall 301 of tire 34, such as the brand of tire 34, is also shown. The depth of tread 306 represents a depth along a plane perpendicular to the surface of each measuring point on tire wheel assembly 14, and is calculated by data processing system 26. In one embodiment, the stripe profile also includes the surface of rim 20.

Figure 4:
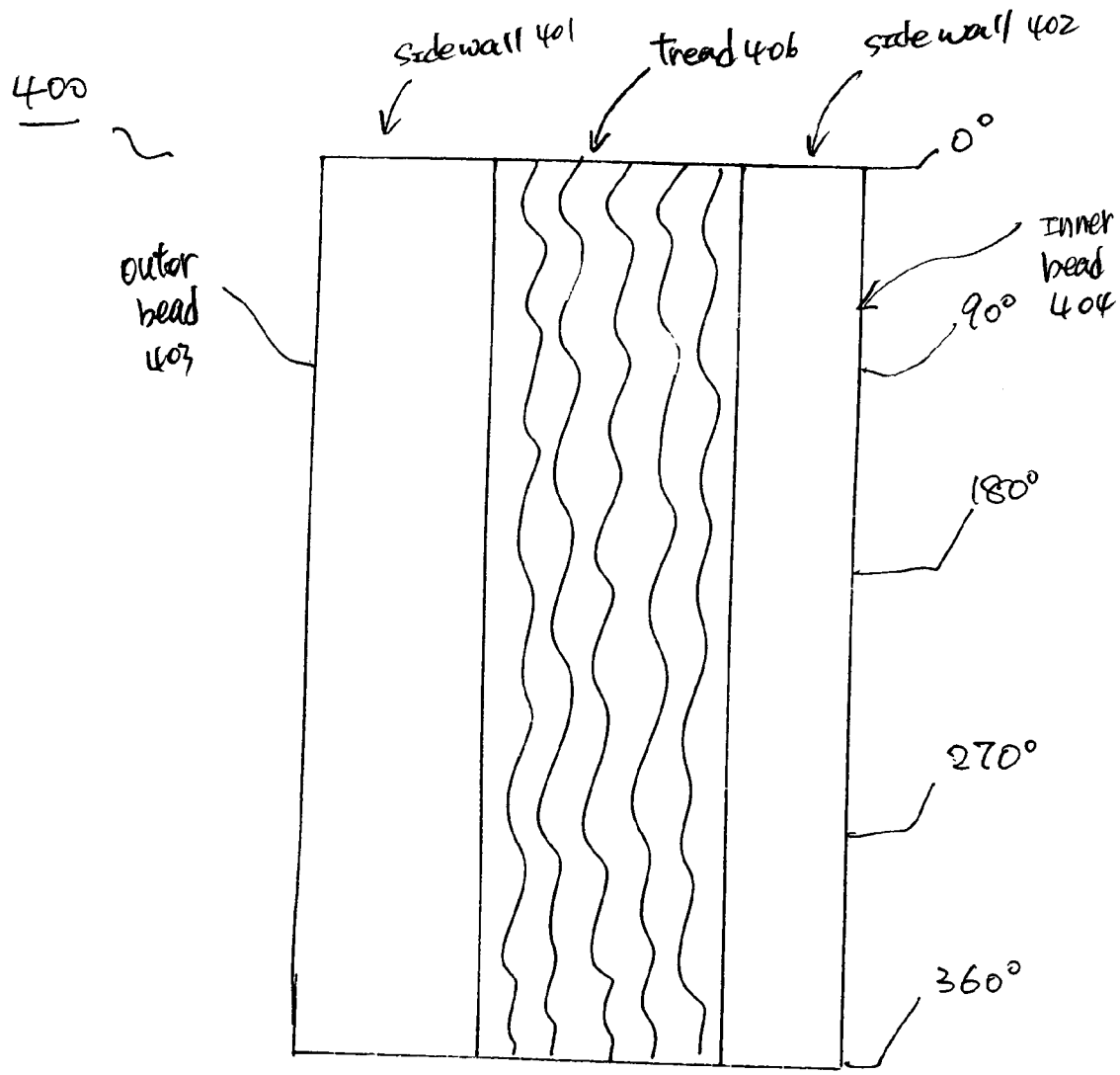
FIG. 4 is a complete surface profile of wheel assembly.

A complete scan of the surface of wheel assembly 14 by emitted light 28 is made by rotating wheel assembly 14 for 360 degrees relative to driven axle 18. Calibration of rotational positions of wheel assembly 14 may be determined based on certain marks on wheel rotational position, such as a tire inflation valve. Data processing 26, based on reflected light signals received during the complete scan of wheel assembly 14, generates a complete profile 400 of wheel assembly 14 (explained in detail below), shown in FIG. 4. The complete profile 400 of wheel assembly 14 includes sidewalls 401, 402, tread 406, outer bead 403, and inner bead 404. In one embodiment, the complete profile 400 of wheel assembly 14 also includes the complete profile of rim 20. According to one embodiment, the display of the complete profile of wheel assembly 14 is color coded. For example, tread 406 and sidewalls 401, 402 are displayed using different colors representing different heights and depths. Color-coded display of profile allows a user to determine potential problem of wheel assembly 14 more easily. For instance, a bulge on sidewall 401 will be shown in colors different from other portions of sidewall 401, such that a user can easily determine deformation of wheel assembly 14.

Figure 5:
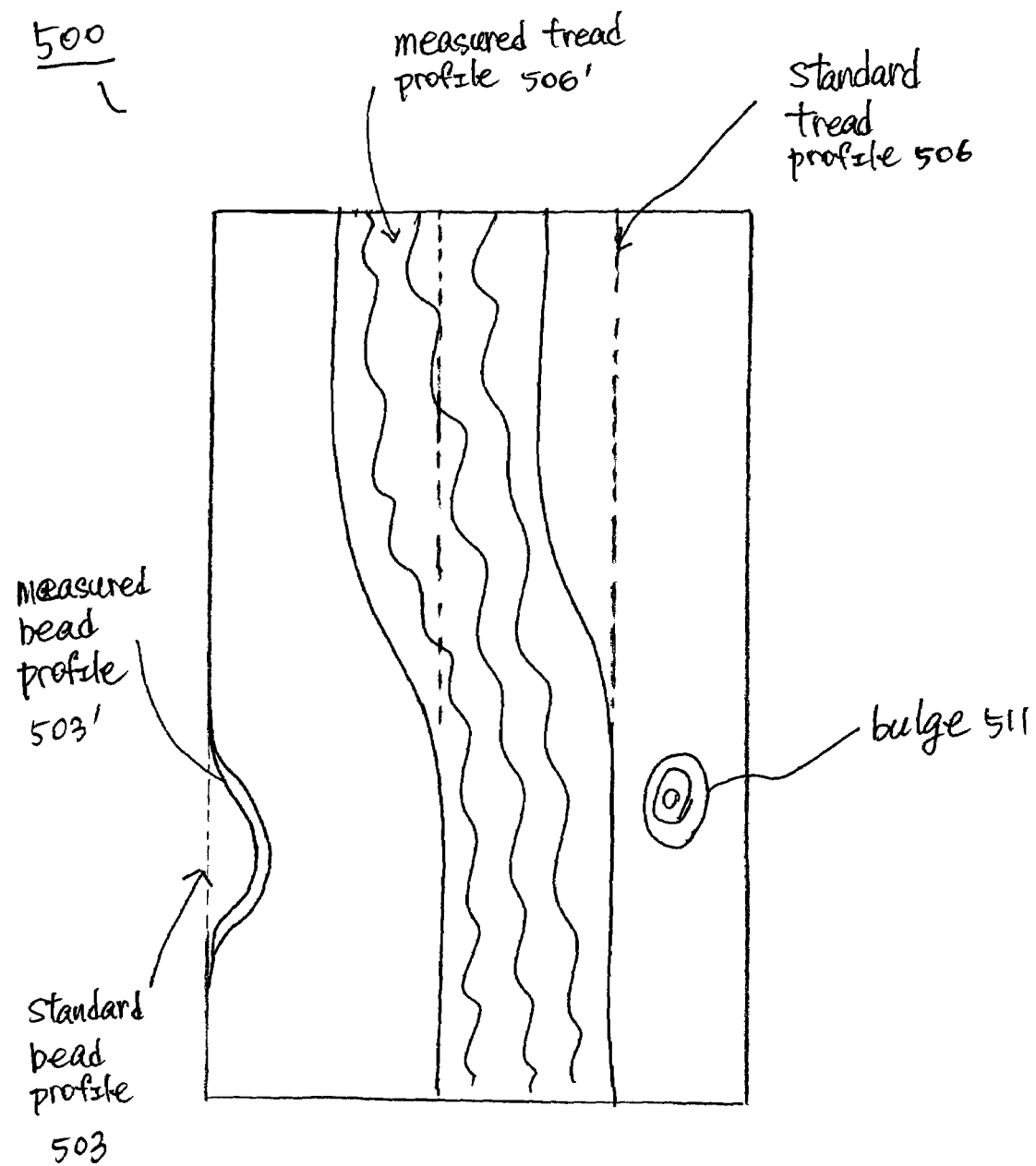
FIG. 5 depicts an example of a comparison between a measured profile with a standard profile of wheel assembly.

Diagnosis of wheel assembly 14 is conducted by data processing system 26 by comparing the generated complete profile 400 of wheel assembly 14 with a standard profile of the same type of wheel assembly 14 by, for example, accessing data stored in a data storage device of data processing system 26 or a remote database through a network connection. Data processing system 26 determines possible problems of wheel assembly 14 based on deviations of the measured profile relative to the standard profile. An example of a comparison between measured profile 500 with a standard profile of wheel assembly 14 is depicted in FIG. 5. Standard tread profile 506 and bead profile 503 are shown in dotted lines. As shown in FIG. 5, measured tread file 506' and bead profile 503' deviate from the locations of standard tread profile 506 and bead profile 503. The deviation in the measured tread profile 506' indicates that wheel assembly 13 may have a bent rim 20 or crooked tire 34. The deviation in the measured bead profile 503' indicates that wheel assembly 14 may have unseated bead. Measured profile 500 also shows bulge 511, which has heights that deviate from the standard sidewall profile, and is shown in colors different from other part of sidewalls if a color-coded display is used. A diagnostic report may be generated by data processing system 26.

In addition to the complete profile of wheel assembly 14, non-contact analytical system 100 utilizes a cross-sectional profile of wheel assembly 14 to diagnose a condition of wheel assembly 14. For example, determination of a tire condition may be made by obtaining a cross-sectional profile of a tire, and determines deviations from a standard cross-sectional profile of the same type of tire. The cross-section of wheel assembly 14 may be parallel to a radial surface passing through the rotational axis of wheel assembly 14.

In one embodiment, the cross-sectional profile is used to determine tire wear conditions of different locations of the tire. The wear conditions at different locations of the tire are compared with each other to determine whether the tire has uneven wear, and whether the tire has been operated or run over-inflated or under-inflated. In one aspect, a wear condition comparison is made between points located on one side of a centerline of the circumferential surface of the tire (mostly includes the treaded surface), with points on the other side of the centerline. If a significant difference exists, it is determined that the tire has uneven wear. In another aspect, a wear condition comparison is made between points inside a region extending from the centerline of the circumferential surface to the sidewalls for a prescribed distance, such as a belt-shape area along the circumferential centerline of the tire, and points outside this region. If tire wear in the region is more severe than points outside this region, it is determined that the tire has been operated or run over-inflated. Otherwise, the tire has been operated or run under-inflated. According to still anther embodiment, a tire wear comparison is made between adjacent tread blocks to determine the existence of a sawtooth pattern. If the height of a tread block is significantly lower than the height of the adjacent tread block, it is indicated that the tire has a sawtooth pattern.

Figure 6A:
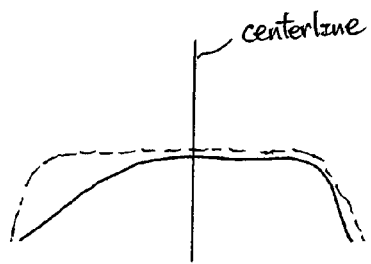
FIGS. 6a, 7a, 8a illustrate a measured cross-sectional profile of a tire overlapping a standard cross-sectional profile.
Figure 6B:
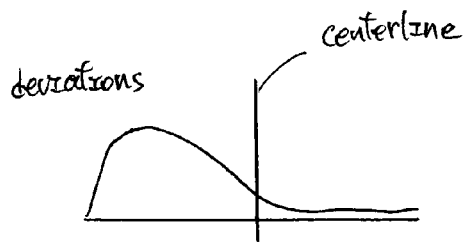
FIG. 6b, 7b, 8b show deviations of a tire from standard cross-sectional profile relative to different portions of the tire shown in FIGS. 6a, 7a, 8a, respectively.
Figure 7A:
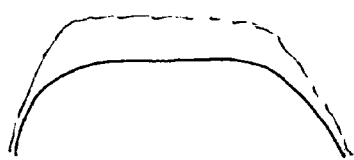
Figure 7B:
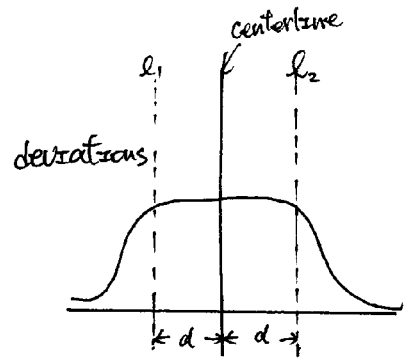
Figure 8A:
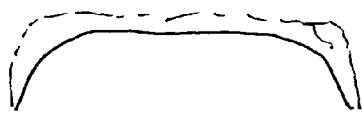
Figure 8B:
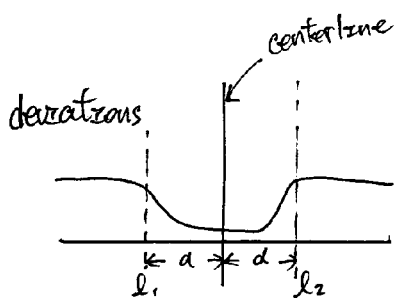

FIGS. 6a, 7a, 8a show a measured cross-sectional profile of tire 34 of wheel assembly 14 overlapping a standard cross-sectional profile (shown in dotted line). FIG. 6b, 7b, 8b illustrate deviations of tire 34 from standard cross-sectional profile (the deviations indicate tire wear) relative to different portions of tire 34 for the measured cross-sectional profiles shown in FIGS. 6a, 7a, 8a, respectively. In one embodiment, analytical system 10 determines the condition of tire 34 by comparing data related to a selected portion of the cross-sectional profile of wheel assembly 14 and/or data derived therefrom, with data related to other portions of the cross-sectional profile of wheel assembly 14 and/or data derived therefrom.

For example, as shown in FIG. 6b, a comparison is made between deviation data related to tire wear on the left side of the centerline of the circumferential surface of the tire, and data related to the right side of the circumferential centerline. As can be seen from FIG. 6b, tire wear on the left side of the circumferential centerline is more severe than that right to the circumferential centerline. The difference between deviations of different portions of the tire indicates that an uneven wear appears on tire 34 of wheel assembly 14.

In FIG. 7b, the selected portion is designated as a region between I1 and I2, which extend from the centerline for a predetermined distance d. The locations of I1 and I2 are chosen empirically, such that a comparison between data related to the selected portion and other portions of wheel assembly 14 reveals differences in tire wear near the center of tire 34 and edges of tire 34 caused by operations with over-inflated or under-inflated tires. FIG. 7b shows that tire wear in the selected portion (between I1 and I2) is more severe than that near the edges of tire 34, which indicates that tire 34 has been operated over-inflated. On the other hand, FIG. 8b shows that tire wear is larger near the two sides of tire 34 than that in the selected portion (between I1 and I2) of tire 34, which indicates that tire 34 has been operated under-inflated. Thus, by calculating and comparing data related to cross-sectional profile of tire 34 and/or deviations from a standard tire relative to different portions of tire 34, such as the center and two edges of tire 34, data processing system 26 can determine a condition of tire 34 of wheel assembly 14.

Figure 9:
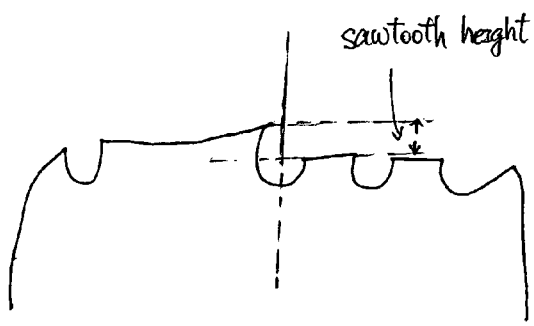
FIGS. 9 and 10 show the cross-sectional profile of a tire with sawtooth tread patterns.
Figure 10:
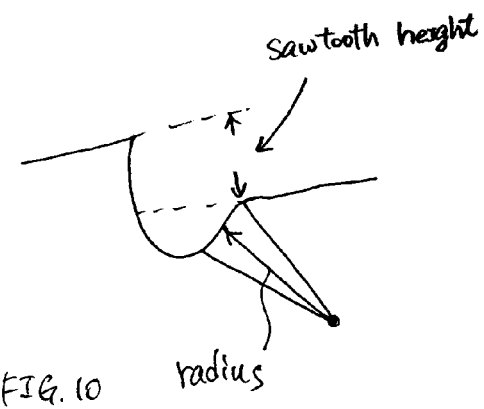

Non-contact analytical system 10 is capable of determining whether tire 34 includes a sawtooth pattern by using, for example, cross-sectional profile of tire 34. As shown in FIG. 9, data processing system 26 determines the existence of a sawtooth pattern by extrapolating the surfaces of adjacent tread blocks, and measuring the height difference at a common point, such as the midpoint of a tread groove. If the height of one tread block is larger than that of the adjacent tread block, data processing system 26 determines that tire 34 includes a sawtooth pattern. If the sawtooth pattern is due to hard cornering, a radius will develop on one side, as shown in FIG. 10. The radius will be an indication of the amount of extreme abuse of the tire, with the larger the radius, the greater the abuse. A report may be generated to indicate whether the tire has been subject to any abuse by comparing the radius with a threshold value.

Figure 11A:
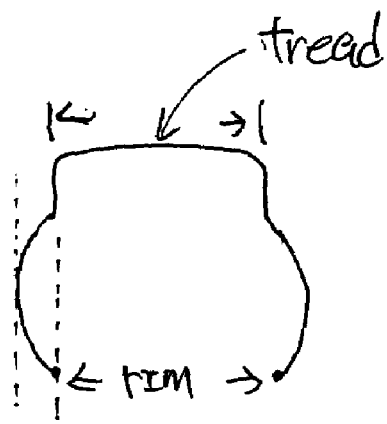
FIGS. 11a–11c depict matching conditions of a tire attaching to a rim.
Figure 11B:
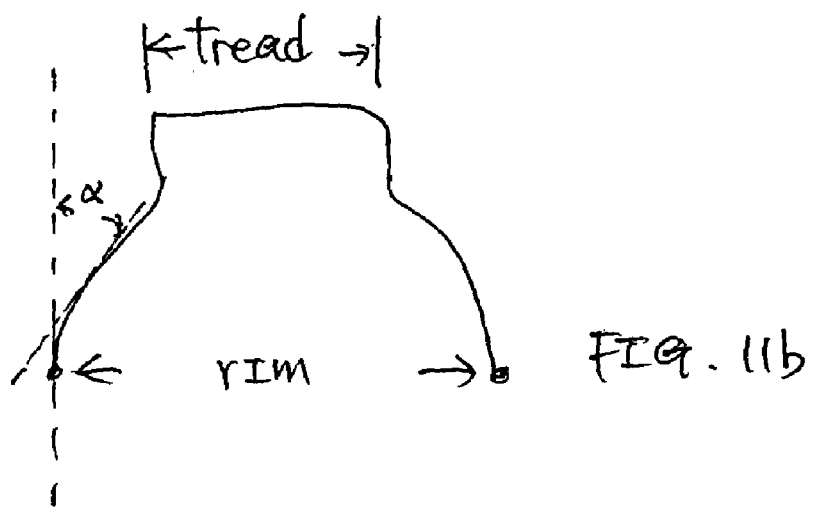
Figure 11C:
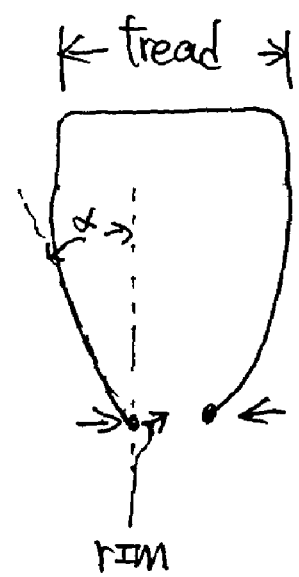

Non-contact analytical system 10 also makes a judgment regarding an improper match of tire width to wheel width based on geometrical information of wheel assembly 14 obtained by the non-contact measurement devices. FIG. 11a shows a proper match, with proper sized tire 34 attached to rim 20. FIG. 11b shows a rim that is too wide for tire 34. FIG. 11c shows tire 34 that is too wide for rim 20. Data processing system 26 may use aspect ratios, i.e., actual tire widths of body and/or tread, using the Tire & Rim Association recommendations. In one embodiment, if a difference between the width of tire 34 and rim 20 is larger than a threshold, analytical system 10 determines that wheel assembly 14 does not have a good match.

In another embodiment, data processing system 26 determines the match condition based on an angle $\alpha$, which is defined as an angle between the surface of a sidewall of tire 34 and a vertical axis passing through the point where tire 34 meets rim 20. For a proper-matched tire and rim, the angle $\alpha$ is substantially zero degree (as shown in FIG. 11a). On the other hand, if angle $\alpha$ is substantially larger or smaller than zero degree, then the sign of the angle $\alpha$ represents a rim that is too wide or narrow for tire 34, based on the definition of the sign of angle $\alpha$.

Figure 12:
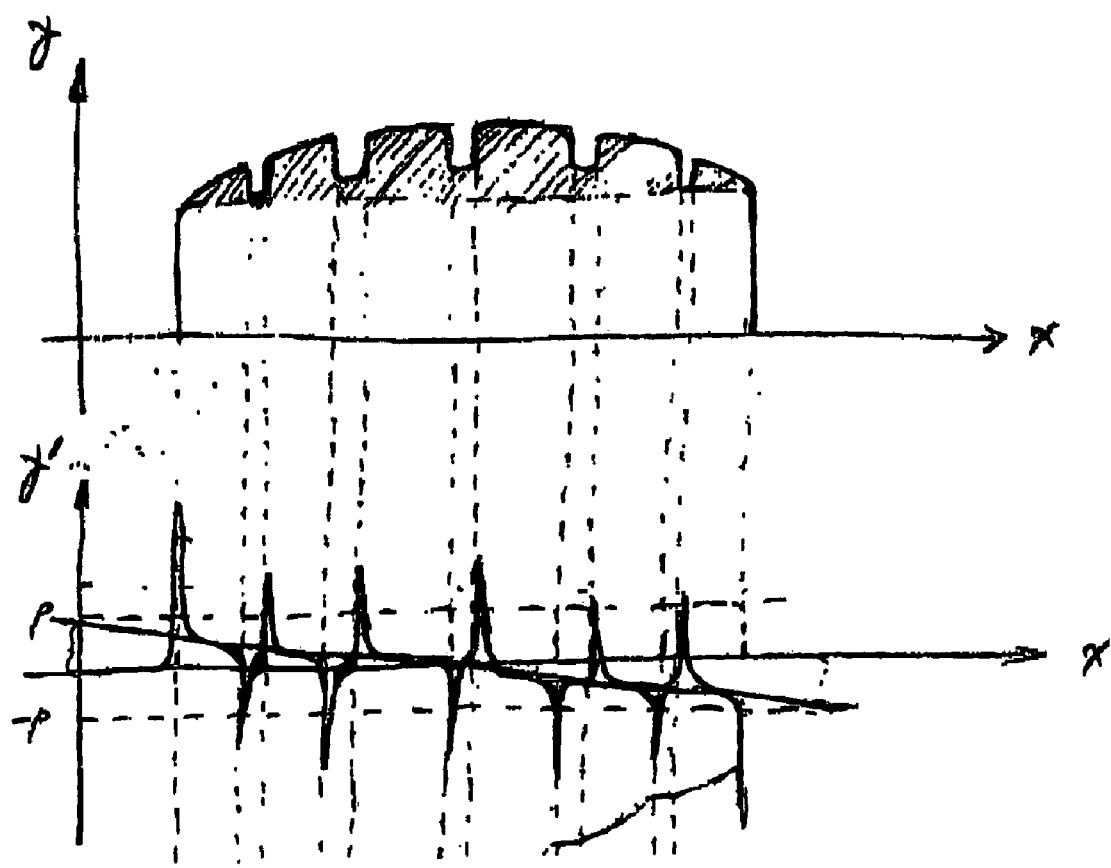
FIG. 12 illustrates a derivative table based on respective heights of different points on a tire.

The detailed process for creating a profile of wheel assembly and processing data is described below:

1. As shown in FIG. 2, a thin plane light projects to a mounted wheel assembly 14 at radius direction and produces light stripe 28 for obtaining of tripe profile of wheel assembly 14.
2. The image of tripe profile of wheel assembly 14 is taken by a camera with a CCD array with pixel at least of 1024×1024.
3. Signals received from CCD are fed to data processing system 26 for processing and analysis.
4. System 10 obtains an average profile of wheel assembly 14, which omits treads, lettering, etc., and establishes a reference, such as a baseline, based on, for example, bottoms of tread grooves. Profile of wheel assembly 14 is plotted above the baseline based on respective heights of different portions of wheel assembly 14 relative to the established baseline.
5. In order to analyze the image of stripe profile, data processing system 26 generates a derivative table based on the data the received image (see FIG. 12).
   a. Critical points of the derivative table appear at positions where the image data has sharp value changes.
   b. The peak values of the derivative represent the depths of treads.
   c. The bottom values represent the shapes of teeth of tread.
   d. The slope of bottom parts of the derivatives represents the worn out condition of tire.
6. Data processing system 26 then generates a set of data representing the stripe profile as follows:

data[j]={16, $d_2 d_3$, . . . , $d_k$}

7. Data processing system 26 repeats steps 1–5 for images obtained by conducting a complete scan of wheel assembly 14 by rotating wheel assembly 14 for 360 degrees. As a result, N sets of data representing N stripe profiles are obtained. The data forms an N by K matrix.

data[i,j]={$d_{i1}$, $d_{i2}$ $d_{i3}$, . . . , $d_{ik}$},

8. Data processing system diagnoses the condition of wheel assembly 14 by using data in each column of the matrix by, for example, comparing the column data with the specifications of wheel assembly 14 stored in a computer data base.

$$data[j] = \begin{vmatrix} d_{1j} \\ d_{2j} \\ d_{3j} \\ . \\ . \\ . \end{vmatrix}$$

9. For each column, a conclusion is generated based on the comparison. Conclusions for all the columns for an array as follows:

conclusion[j]={14, 15, $c_3$, . . . , $c_p$}

10. Data processing system generates and outputs an analytical by analyzing the conclusion array.

An example of the process for processing data related to profile of wheel assembly 14 is described as follows:

1. Assume that the matrix obtained after a complete scan of wheel assembly 14 is as follows:

$$\begin{vmatrix} 1 & 9 & 14 & y_{11} & y_{12} & \ldots & y_{1k} & s_{11} & s_{12} & \ldots & s_{1p} \\ 2 & 1. & 15 & y_{21} & y_{22} & \ldots & y_{2k} & s_{21} & s_{22} & \ldots & s_{2p} \\ 3 & 12 & c_3 & y_{31} & y_{32} & \ldots & y_{3k} & s_{31} & s_{32} & \ldots & s_{3p} \\ a_q & b_q & c_q & y_{ql} & y_{q2} & \ldots & y_{qk} & s_{ql} & s_{q2} & \ldots & s_{qp} \\ 0 & 0 & 0 & x_1 & x_2 & \ldots & x_k & 0 & 0 & \ldots & 0 \end{vmatrix}$$

wherein
$a_j$, $b_j$ and $c_j$ are measurements from boundaries of the tire profile to boundaries of the image;
$y_{mn}$ are depths of tread;
$x_j$ records positions of the treads; and
$s_{mn}$ are slopes of the teeth of tire tread.

Because the area of image is fixed, the following relationship is true:

width of tire=25($c_i$–$a_i$), diameter of tire=26($b_i$)

Tread Depth Analysis:
(a) In calculating tread depth, average value of each column is obtained:

$$mean(y_j) = \left(\sum_{i=0}^{q} y_{i,j}\right) \bigg/ q$$

Data processing system 26 compares the average data of $y_j$ with the specifications of wheel assembly 14. Data related to deviations from the specifications are generated based on the comparison. As discussed earlier, by analyzing deviations from specifications at different portions of wheel assembly 14, data processing system determines an uneven wear condition, over-inflated condition or under-inflated condition of wheel assembly 14. The deviations also provide information about taper worn out that is caused by toe problems.

(b) For each column, data processing system calculates a deviation of depth from the average value of each column:

$$dev(y_j) = \sum_{i=0}^{q} [y_{i,j} - mean(y_j)]^2$$

The array of {dev($y_j$)} provides information about uneven wear. It can be used in check of rib wear, flat spotting and so on.

Teeth Slope Analysis:
Data processing system 26 obtains average values of slope for each column:

$$mean(s_j) = \left(\sum_{i=0}^{q} s_{i,j}\right) \bigg/ q$$

The array of {mean($s_1$), mean($s_2$), mean($s_3$), . . . , mean($s_p$)} provides information on tire teeth. If the average slopes are all positive or negative, it means the wheel assembly includes sawtooths that could be caused by a toe problem. Also it may mean a taper wear across tire treads. By comparing the tooth slopes of wheels on different sides of a vehicle, a camber problem can be determined.

Information on Tire Shape:
(a) Data of columns {$a_i$} and {$c_i$} provides information on tire sidewalls, width of tire, size of tire, and so on. By comparing data in these columns, data processing system determines whether wheel assembly 14 has bulges on the sidewalls, and whether the wheel assemblies are of identical size. Data processing system 26 can use the data to check the extent of round off. For example, if only one value of $a_i$ is greater than the others, the data processing system may determine that wheel assembly 14 has a bulge problem. If the data {$a_i$} presents a sinusoidal distribution, data processing system 26 indicates an axial round off detected. By comparing the value of ($c_i$–$a_i$) on different wheel assemblies, data processing system 26 determines if there is any mismatched wheel assembly.

(b) Data of column {$b_i$} provides information on radius condition. Analysis of column {$b_i$} can be used to solve problems of diameter matching, bulge on the tire surface, radius round off and so on. The technique used for analysis in column {$b_i$} is basically as same as above.

All weighted values are zeros at beginning of analysis. Assume the range of weighted value for each problem is from 0 to 1.

As various factors may affect the condition of wheel assembly 14, non-contact analytical system 10 provides a weighting method to determine affects from various factors. For example, by analysis of the slopes of each tooth of the tire tread, it reveals problems of toe and camber. In response, data processing system 26 assigns weighted values for these two problems. For example, 0.2 is assigned to a toe problem, and 0.15 is assigned to a camber problem. The values are based on the seriousness of each problem. If an additional tread check is conducted to evaluate the height of each adjacent tooth, the result reveals the existence of a sawtooth pattern, which is likely to be caused by a toe problem. Based on this determination, data processing system 26 adds 0.3 to the toe problem. Thus, the weight for a toe problem increases to 0.5. After all the evaluations have been applied, each cause that is likely to cause the tire problem has its weight value assigned. The weight values provide the extent of certainty and reliability of the cause of tire problems.

FIG. 13 shows a block diagram of an exemplary data processing system 26. The data processing system 26 includes a bus 902 or other communication mechanism for communicating information, and a data processor 904 coupled with bus 902 for processing data. The data processing system 26 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by data processor 904. Data processing system 26 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions. The data processing system 26 and/or any of the detectors and/or terminals may also have suitable software and/or hardware for converting data from one format to another. An example of this conversion operation is converting format of data available on the system 26 to another format, such as a format for facilitating transmission of the data.

The data processing system 26 may be coupled via bus 902 to a display 912, such as a cathode ray tube (CRT) or liquid crystal display (LCD), for displaying information to an operator. An input device 914, including alphanumeric and other keys, is coupled to bus 902 for communicating information and command selections to processor 904. Another type of user input device is cursor control (not shown), such as a mouse, a touch pad, a trackball, or cursor direction keys and the like for communicating direction information and command selections to processor 904 and for controlling cursor movement on display 912.

The data processing system 26 is controlled in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions. Those skilled in the art will recognize that the data processing system 26 may run other programs and/or host a wide range of software applications.

The term "machine readable medium" as used herein refers to any medium that participates in providing instructions to processor 904 for execution or providing data to the processor 904 for processing. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902 or an external network. Transmission media can also take the form of acoustic or light signals, such as those generated during radio wave and infrared data communications, which may be carried on the links of the bus or network.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 904 for execution. For example, the instructions may initially be carried on a magnetic disk of a remote data processing system, such as a server. The remote data processing system can load the instructions into its dynamic memory and send the instructions over a telephone line using a modem. A modem local to data processing system 26 can receive the data on the telephone line and use an infrared transmitter to convert the data to an infrared signal. An infrared detector can receive the data carried in the infrared signal and appropriate circuitry can place the data on bus 902. Of course, a variety of broadband communication techniques/equipment may be used. Bus 902 carries the data to main memory 906, from which processor 904 retrieves and executes instructions and/or processes data. The instructions and/or data received by main memory 906 may optionally be stored on storage device 910 either before or after execution or other handling by the processor 904.

Data processing system 26 also includes a communication interface 918 coupled to bus 902. Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a wired or wireless local area network (LAN) card to provide a data communication connection to a compatible LAN. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network to data equipment operated by an Internet Service Provider (ISP) 926. ISP 926 in turn provides data communication services through the world wide packet data communication network now commonly referred to as the Internet 927. Local network and Internet 927 both use electrical, electromagnetic or optical signals that carry digital data streams. The signals through the various networks and the signals on network link 920 and through communication interface 918, which carry the digital data to and from data processing system 26, are exemplary forms of carrier waves transporting the information.

The data processing system 26 can send messages and receive data, including program code, through the network(s), network link 920 and communication interface 918. In the Internet example, a server 930 might transmit a requested code for an application program through Internet 927, ISP 926, local network and communication interface 918.

The data processing system 26 also has various signal input/output ports for connecting to and communicating with peripheral devices, such as printers, displays, etc. The input/output ports may include USB port, PS/2 port, serial port, parallel port, IEEE-1394 port, infra red communication port, etc., and/or other proprietary ports. The data processing system 26 may communicate with other data processing systems via such signal input/output ports.

Although currently the most common type, those skilled in the art will recognize that the PC is only one example of the types of data processing systems a user may operate to communicate via the Internet. Other end-user devices include portable digital assistants (PDAs) with appropriate communication interfaces, cellular or other wireless telephone devices with web or Internet access capabilities, web-TV devices, etc.

It is intended that all matter contained in the above description and shown in the accompanying drawings shall be interpreted as illustrative and not in a limiting sense. It is also to be understood that the following claims are intended to cover all generic and specific features herein described and all statements of the scope of the various inventive concepts which, as a matter of language, might be said to fall there-between.

What is claimed is:

1. A method for determining a condition of a tire having a rotational axis and a treaded surface disposed between two sidewalls, the method comprising the steps of:
   obtaining height information of a plurality points on the tire, wherein the plurality of points are selected from the treaded surface;
   comparing height information of a designated portion of the plurality of points, with height information of at least one other portion of the plurality of points;
   determining a condition of the tire based on a result of the comparing step; and
   generating a result indicating the condition.

2. The method of claim 1, wherein the plurality of points are on a path extending in a direction from one of the sidewalls to the other.

3. The method of claim 2, wherein:
   the path is parallel to the rotational axis of the tire;
   the designated portion of the plurality of points is selected from points located on one side of the centerline of the circumferential surface of tire;
   the comparing step compares the height information for points on one side of the centerline of the circumferential surface of the tire, with height information for points on the other side of the centerline of the circumferential surface of the tire; and
   the determining steps determines whether the tire has uneven wear based on a difference between the height information for points on one side of the centerline of the circumferential surface of the tire, and height information for points on the other side of the centerline of the circumferential surface of the tire.

4. The method of claim 2, wherein
   the path is parallel to the rotational axis of the tire;
   the designated portion of the plurality of points is selected from points located in a region extending from a centerline of the circumferential surface of tire towards the sidewalls for a prescribed distance;
   the comparing step compares the height information for points located in the region with height information for points outside the region; and
   the determining steps determines whether the tire has been operated over-inflated or under-inflated based on a difference between the height information for points located in the region and height information for points outside the region.

5. The method of claim 4, wherein:
   the height information includes information related to tire wear; and
   the determining step including the steps of:
   responsive to tire wear of the designated region being more severe than tire wear outside the designated region, indicating that the tire has been operated over-inflated; and
   responsive to tire wear outside the designated region being more severe than tire wear of the designated region, indicating the tire has been operated under-inflated.

6. The method of claim 2, wherein the designated portion is selected as a first tread block of the treaded surface;
   the comparing step compares height information of the first tread block with height information of a second tread block adjacent the first tread block; and
   the determining step determines whether the tire has a sawtooth pattern based on a difference between the height information of the first tread block and the height information of a second tread block adjacent the first tread block.

7. The method of claim 6 further including the steps of:
   determining a radius of a surface of one of the first and second tread blocks that has a lower height; and
   determining an abuse status of the tire based on the length of the radius.

8. The method of claim 1, wherein the height information is generated by comparing respective heights of the plurality of points, to those specified in a specification of the tire.

9. A system for analyzing a condition of a tire having a rotational axis and a treaded surface disposed between two sidewalls, the system comprising:
   an emitter source for emitting radiation signals towards the tire;
   a detector for receiving signals reflected from the tire in response to the emitted radiation signals;
   a data processing system, coupled to the emitter source and the detector, for processing data, wherein the data processing system is configured to perform the steps of:
   obtaining height information of a plurality points on the tire based on the signals received from the detector, wherein the plurality of points are selected from the treaded surface;
   comparing height information of a designated portion of the plurality points on the tire with height information of at least one other portion of the plurality of points;
   determining a condition of the tire based on a result of the comparing step; and
   generating a result indicating the condition.

10. The system of claim 9, wherein the plurality of points are on a path extending in a direction from one of the sidewalls to the other.

11. The system of claim 10, wherein:
    the path is parallel to the rotational axis of the tire;
    the designated portion of the plurality of points is selected from points located on one side of a centerline of the circumferential surface of the tire;
    the comparing step includes a step of comparing the height information for points on one side of the centerline of the circumferential surface of the tire, with height information for points on the other side of the centerline of the circumferential surface of the tire; and the determining steps determines whether the tire has uneven wear based on a difference between the height information for points on one side of the centerline of the circumferential surface of the tire, with height information for points on the other side of the centerline of the circumferential surface of the tire.

12. The system of claim 10, wherein:

the path is parallel to the rotational axis of the tire;

the designated portion of the plurality of points is selected from points located in a region extending from a centerline of the circumferential surface of the tire to the sidewalls for a prescribed distance;

the comparing step includes a step of comparing the height information for points located in the region with height information for points outside the region; and the determining steps determines whether the tire has been operated over-inflated or under-inflated based on a difference between the height information for points located in the region and height information for points outside the region.

13. The system of claim 10, wherein the designated portion of the height information is selected as a first tread block of the treaded surface;

the comparing step compares height information of the first tread block with height information of a second tread block adjacent to the first tread block; and the determining step determines whether the tire has a sawtooth pattern based on a difference between the height information of the first tread block and the height information of a second tread block adjacent the first tread block.

14. The system of claim 13 further including the steps of:

determining a radius of a surface of one of the first and second tread blocks that has lower height; and determining an abuse status of the tire based on the length of the radius.

15. The system of claim 9, wherein the data processing system generates the height information by comparing respective heights of the plurality of points, to respective heights corresponding to the plurality of points specified in a specification of the tire.

16. A system for analyzing a condition of a tire having a rotational axis and a treaded surface disposed between two sidewalls, the system comprising:

emitting means for emitting radiation signals towards the tire;

detecting means for receiving signals reflected from the tire in response to the emitted radiation signals;

data processing means, coupled to the emitting means and the detecting means, for processing data, wherein the data processing means is configured to perform the steps of:

obtaining height information of a plurality points on the tire based on the signals received from the detecting means, wherein the plurality of points are selected from the treaded surface;

comparing height information of a designated portion of the plurality points on the tire with height information of at least one other portion of the plurality of points;

determining a condition of the tire based on a result of the comparing step; and generating a result indicating the condition.

17. The system of claim 16, wherein the plurality of points are on a path extending in a direction from one of the sidewalls to the other.

18. The system of claim 17, wherein:

the path is parallel to the rotational axis of the tire;

the designated portion of the plurality of points is selected from points located on one side of a centerline of the circumferential surface of the tire;

the comparing step includes a step of comparing the height information for points on one side of the centerline of the circumferential surface of the tire, with height information for points on the other side of the centerline of the circumferential surface of the tire; and the determining steps determines whether the tire has uneven wear based on a difference between the height information for points on one side of the centerline of the circumferential surface of the tire, with height information for points on the other side of the centerline of the circumferential surface of the tire.

19. The system of claim 17, wherein:

the path is parallel to the rotational axis of the tire;

the designated portion of the plurality of points is selected from points located in a region extending from a centerline of the circumferential surface of the tire to the sidewalls for a prescribed distance;

the comparing step includes a step of comparing the height information for points located in the region with height information for points outside the region; and the determining steps determines whether the tire has been operated over-inflated or under-inflated based on a difference between the height information for points located in the region and height information for points outside the region.

20. The system of claim 17, wherein the designated portion of the height information is selected as a first tread block of the treaded surface;

the comparing step compares height information of the first tread block with height information of a second tread block adjacent the first tread block; and the determining step determines whether the tire has a sawtooth pattern based on a difference between the height information of the first tread block and the height information of a second tread block adjacent the first tread block.

* * * * *